March 10, 1959  R. L. RUSHER ET AL  2,877,142
PROCESS FOR INCREASING THE SOIL RESISTANCE OF A SOLID SURFACE
Filed Feb. 28, 1955

INVENTORS
ROBERT L. RUSHER
PAUL C. YATES

BY  Fred C. Carlson
ATTORNEY

United States Patent Office 2,877,142
Patented Mar. 10, 1959

2,877,142

PROCESS FOR INCREASING THE SOIL RESISTANCE OF A SOLID SURFACE

Robert L. Rusher, New Castle Hundred, and Paul C. Yates, Brandywine Hundred, Del., assignors to E. I. du Pont de Nemours and Company, Wilmington, Del., a corporation of Delaware Application February 28, 1955, Serial No. 490,992

7 Claims. (Cl. 117—169)

This invention relates to methods for making surfaces more difficult to soil and for producing treated surfaces which, if soiled, are easier to clean, to the treating compositions used, and to articles with surfaces so treated. More particularly the invention pertains to such processes in which a unitary and substantially continuous solid surface having a 60° Gardner gloss rating of 5 to 85 is coated with a sol having a discontinuous phase consisting essentially of water-insoluble, inorganic particles with at least two dimensions in the range of 5 to 20 millimicrons, said particles preferably being coalescible with a surface area loss of 1 to 80%, and the continuous phase of the sol is removed from the coating; further pertains to the coating compositions comprising sols, the discontinuous phase of which consists essentially of water-insoluble, substantially inorganic particles which are coalescible with a specific surface area loss of 1 to 80% and which have at least two dimensions in the range of 5 to 20 millimicrons and the continuous phase of which contains a dissolved surfactant; and still further pertains to articles in which there is a surface of the character described which has a coating of the sol particles with the continuous phase removed.

Figure 1:
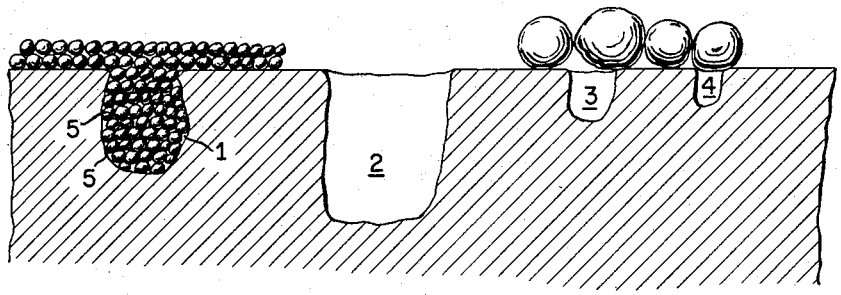
Figure 2:
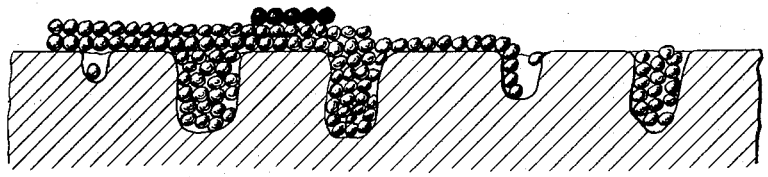
Figure 3:
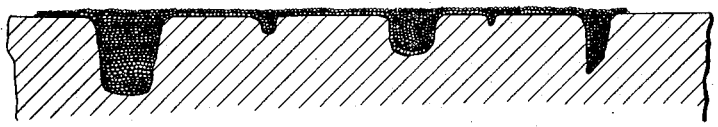
Figure 4:
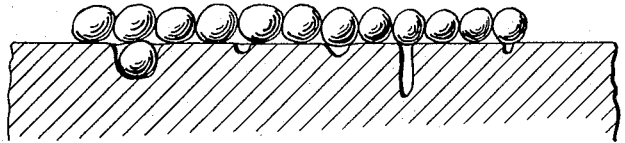
Figure 5:
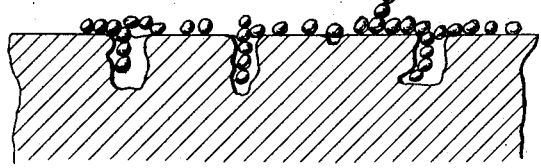

In the drawing, Figure 1 is a fanciful representation showing the profile of a surface of the type treated according to the invention, bearing a coating of inorganic particles of various sizes, and Figure 2 is a similar representation showing a partial coating of soil and Figure 3 shows the tight, relatively dense coating obtained from sol particles of smaller particle size within the operable range in contrast to Figure 4 which shows the relatively loose coating obtained with sol particles which are near the upper limit of size, and Figure 5 shows how coalesced particles of the coating can fill the surface irregularities.

The age-old problem of making surfaces resistant to soiling has never been satisfactorily solved. Coatings heretofore used for this purpose have effected such a modification of the surface as to cause it to lose its original character. For instance, wood work can be painted or vanished, and the surface is then easier to clean, but the surface has become that of the paint or varnish film, rather than of the original wood. Moreover, even the paint or varnish film can become soiled and is more or less difficult to clean, so that while an improvement has been effected through its application, there is still much to be desired.

Soil commonly encountered on substantially continuous surfaces is composed of "non-permanent" and "permanent" types. "Non-permanent" soil can be removed by such usual cleaning methods as vacuuming, dry wiping, or scrubbing with water containing soap or detergents. "Permanent" soil cannot be removed by these methods and results in a steady build up of soil even on surfaces which are cleaned frequently. Permanent soiling of this nature eventually requires refinishing of the surface and is thus a source of serious economic loss. This type of soiling is exemplified by the dingy appearance of exterior painted, masonry, and stone surfaces in metropolitan and industrial areas; it is also common on interior painted walls and woodwork which have been repeatedly soiled and washed, and is encountered in many other places as well.

The present invention is especially concerned with effecting improvement on those surfaces which are susceptible to permanent soiling or are inaccessible to cleaning by such methods as dry wiping, scrubbing with soap and water, and the like. Discontinuous surfaces, such as the surfaces of textile fabrics, are easily cleaned by laundering or immersion in dry-cleaning solvents, so that soil removal is less difficult. On the other hand, laundering and dry-cleaning are not applicable to surfaces such as those of plastics, paint and varnish films, etc., so that improvement in the initial resistance to soiling and ease of soil removal after treatment becomes very desirable.

A particular advantage of the most highly preferred aspects of the present invention is the relatively permanent protection afforded by the treatment.

The treated surfaces can be repeatedly soiled and cleaned by vacuuming or dry wiping with little or no loss in the effectiveness of protection. The treatment will even withstand very severe cleaning techniques such as scrubbing with hot soapy water for several cycles of soiling and cleaning and still offer considerable protection against soiling.

Very glossy surfaces are highly resistant to soiling. Gloss is readily measurable, as with a Gardner gloss meter. When the 60° rating by this method is a gloss greater than 85, as in the case of cellophane, the surface is so smooth that soiling ordinarily presents no problem. When the gloss is less than 5, the surface is either discontinuous or so irregular that excessive amounts of coating agents are required for soil proofing. In either case the surface is of such a nature as to not lend itself to improvement against soiling by the methods of this invention.

Within the gloss limits of 5 to 85 the surfaces treated are sufficiently irregular that soiling is a problem, but one which can be solved according to our invention. Referring again to Figure 1 of the drawings it will be seen that the profile presents an irregular surface, with substantial pores or depressions at 1, 2, 3, and 4. If there were a high proportion of cavities the size of that shown at 2, the gloss reading would probably be less than 5 and the surface too irregular; however, when such large recesses are in the minority they do not prevent successful treatment.

Now according to the present invention it has been found that by coating the described surfaces with a sol—that is, a colloidal dispersion in a liquid—of water-insoluble, inorganic particles having at least two dimensions in the range of 5 to 20 millimicrons, said particles preferably being coalescible with a surface area loss of 1 to 80%, the surfaces are made more difficult to soil and, when soiled over the coating, are easier to clean.

The anti-soiling processes of this invention are believed to protect surfaces against soiling in a complex manner. Initially, the surfaces are protected against the deposition of soil particles because the anti-soiling agent is deposited in and occupies surface cracks, crevices, holes and other irregularities which normally function as receptor sites for soil retention. Secondary protection in the form of more effective cleaning upon wiping, brushing, or vacuuming is obtained because there is a partial removal of a relatively loosely adherent layer of film of excess anti-soiling agent along with the soil deposited on this layer. This secondary process seems to be operative even without any wiping, brushing or vacuuming, if there are present weathering conditions or air currents which involve mild abrasion at this surface. Ultimate protection is afforded by the greatly increased ease of wet cleaning of the treated surface. This appears to occur by reason of a partial peptization of the anti-soiling agent, together with adhering soil, upon washing with a solution containing chemical reagents capable of imparting an electrical charge to the surface of the colloidal particles. The foregoing theoretical explanation appears to fit the observable facts, but applicants do not intend to be bound by any theory or explanation except as comprehended in the appended claims.

According to the above-described theory, for optimum protection of a surface the particles of the anti-soiling agent should fit the receptor sites perfectly, with respect to both the size and the shape of the sites or irregularities. Since most of the surfaces treated according to this invention have a range of different size and shape irregularities, treatment with an anti-soiling agent capable of filling only one size or shape does not provide maximum effectiveness. Conceivably, protection might be obtained by treating the surface with an anti-soiling composition containing a range of particle shapes and sizes exactly matching the surface. Such a process is not practical, however, since the size, shape, and number of surface irregularities must be determined experimentally for each substrate treated. It is also necessary to prepare a special anti-soiling composition for each substrate having a different distribution of irregularities with regard to size, shape, and number. And even when this is done, there is no means of insuring that each particle of the anti-soiling composition is deposited in a matching receptor site on the surface. Particles which do not find matching sites are either quickly lost under mildly abrasive soiling conditions without furnishing protection, or actually contribute to soiling by increasing the irregularity of the surface.

It is preferred, therefore, that the anti-soiling agent consist of colloidal particles which are smaller than the smallest surface irregularity. It is also preferred that these particles be capable of coalescing or uniting together with the formation of chemical bonds between the respective particles. Anti-soiling agents having these characteristics almost perfectly fill all irregularities with either the ultimate particles or aggregates of these particles. In Figure 1, at 1, there is illustrated an irregularity or soil-receptor site which has been filled and covered over by a group of coalesced particles of antisoiling agent 5. The filling process is aided by the compressive forces exerted by the surface tension of the liquid, continuous phase of the sol as it evaporates. The particles are forced by surface tension into unfilled irregularities as they continue to coalesce until the available space in the surface irregularity is completely filled.

If the bonds formed by coalescence of ultimate particles are water-insoluble, the anti-soiling treatment will stand up well even when exposed to outdoor weathering conditions.

In the anti-soiling processes of this invention the particles of the treating soil are in the size range of 5 to 20 millimicrons. The reason for this is apparent by comparing the illustrations in Figures 3 and 4. Figure 3 shows the complete coating which is achieved using coalesced particles of the desired small particle size—in the range of 5 to 20 millimicrons—whereas Figure 4 shows that while a coating is achieved with larger particles—near the upper limit of the range—the larger particles do not fit the soil receptor sites and cannot do as good a job of anti-soiling.

It will be understood that the initial treating sol may contain particles which are already partly coalesced befor being applied to the surface to be protected. In this event, the anti-soiling process is still effective, but as will be seen from Figure 5 which illustrates this practice, the filling of the surface irregularities is not nearly as complete as under the practice illustrated in Figure 3.

Now while it is desirable that the inorganic colloidal particles of the anti-soil agent shall have the ability to coalesce, it is definitely not preferred to use materials which coalesce to homogeneous, structureless films. Film-forming materials of this nature tend to follow the contours of the surface rather than to fill in surface irregularities. A surface-conforming film contributes little to anti-soiling since a slightly modified reproduction of the original surface is thereby obtained which still contains irregularities capable of collecting and retaining soil. An additional disadvantage of such completely coalesced films, compared to the preferred agents which are only partly coalesced is the absence of "chalking" on dry abrasion and "peptization" upon wet cleaning, both of which facilitate the cleaning of the soiled treated surfaces. Moreover, completely coalesced films can be removed only by solvents capable of dissolving them and such solvents frequently damage the substrate.

The degree of coalescence upon drying of a particular sol can be expressed in terms of the loss of surface area upon drying. Thus, if a treating sol containing particles having a surface area of 500 m.$^2$/g. were dried down and found to give an anti-soiling deposit having a surface area of 250 m.$^2$/g., the surface area would show a 50% drop and the substance would be considered to be 50% coalesced. According to the preferred practices of this invention the colloidal sols used as anti-soil agents are from 1 to 80% coalesced.

Considering now in more detail the surfaces which are given improved resistance to soiling by processes of this invention, it is noted that the surfaces are unitary and substantially continuous in structure. By unitary it is meant that the structural units comprising the surface are united together or combined into one body in which it is no longer possible to distinguish their existence as separate units. By substantially continuous it is meant that the surface has continuity so that it extends throughout its area without major breaks, cessations, interruptions, or appreciable intervening spaces. Minor discontinuities, each of which is small in respect to the continuous surface area surrounding it, and the sum of all of which comprises only a fraction of the total surface area, are not precluded, however. As already mentioned, the surface will contain the minor irregularities which act as soil-receptor sites and additionally may contain submicroscopic or even microscopic rents, tears, cracks, crevices, or holes; but so long as the area of each discontinuity is small and the aggregate area no more than about 20% of the total area the substrates are amenable to treatment according to this invention.

Procedures for investigating the micro-structure of the surface of a substrate will, of course, vary with the nature of the substrate. Probably the most important consideration is the size of irregularities such as cracks, crevices, and holes in the surface. In general, there is one set of experimental procedures which are satisfactory for studying such surface irregularities in the size range above $1/10$ micron and another set best suited for surface irregularities smaller than $1/10$ micron. The former can be advantageously studied by means of a light microscope. To get some idea of the depth of such irregularities, it is convenient to take photomicrographs at two angles and then use a stereoscope to give a three-dimensional picture of the substrate surface. By this method, $5/10$ micron irregularities can be magnified to an apparent size of approximately 2.5 millimeters. Surface irregularities smaller than .5 micron can be studied by shadow-cast electron micrographs. With this technique, both the area and the depth of surface irregularities ranging from $5/10$ micron to 1 millimicron can be studied. Thus, by a combination of these techniques, it is possible to determine surface irreguilarties with regard to extent and depth ranging in size from 1 millimicron up to macroscopic dimensions.

In certain instances, it may be desirable to sacrifice the detailed knowledge obtainable with photographic methods in the interest of speed. In such cases, the following techniques may be employed.

For surface discontinuities above about 1/10 of a micron, the method of angular dependence light scattering by reflected light is quite effective in giving an idea of the particle size distribution of surface irregularities. For smooth glossy substrates in which the holes are less than 5/10 micron in size, the technique of multiple beam interferometry may be used. This technique is operative with surface irregularities extending downward in size to approximately 10 millimicrons. Alternatively, the average pore size of surface irregularities in the sub-microscopic range can be determined from a nitrogen adsorption isotherm by the techniques used to obtain similar information on gels and other porous bodies. A mercury penetrometer can be used to obtain the average pore size of pores in the microscopic range.

A particularly simple and direct procedure which is sufficiently accurate for most purposes involves exposure of samples of the substrate to a series of experimental soils of graded particle sizes followed by analysis to determine the quantity of soil strongly retained in each size range. The analysis can be accomplished by the use of radioactive soils, by soils contining absorbed, easily analyzed substances such as dyes, or by direct analysis for the soil itself. Carbon black can be obtained commercially in a range of particle sizes and is convenient soiling agent for the characterization of surfaces by this technique.

While the substrates will be substantially unitary, they do not have to be homogeneous, either chemically or with respect to their physical appearance. Thus pigmented paint films and filled plastic films or molded objects are satisfactory substrates, as are the unitary surfaces of heterogeneous compositions such as masonry walls, vitreous or fired objects such as ceramics, naturally occurring stone, enameled ware, and similar materials.

All kinds of films and coatings are suitable objects for treatment according to the invention: for example, paints based on alkyd resins, rubber, oleoresins, epoxyresins, phenolformaldehyde resins, melamine resins, urea-formaldehyde resins, acrylic resins, styrene resins, butadiene resins, copolymer latex paints, oil and water paints, and other distemper paints, polyester paints, lacquers, and varnishes using either natural or artificial resins. In addition to coatings applied from solvents there may be used coatings which are applied in a fused condition by spraying or brushing with suitable equipment. In short, any paint or coating film can be benefited according to processes of the invention.

Instead of treating films of the type described, processes of the invention can be used for treating self-supporting films of plastics. Thus there can be treated films of polyester resins, esters of substituted and unsubstituted terephthalic acids with difunctional alcohols, nylon films, films of vinyl, acrylic, vinylidene chloride, acrylonitrile, or polyethylene resins, or any film of organic, natural or synthetic material.

Massive articles can also be benefited provided they have a continuous surface. Thus linoleum or other floor covering materials and building materials which have a continuous surface can be treated. Articles of metal, wood, and especially hardwoods, can be treated. Ceramic materials which present a substantially continuous coating can be treated. Asbestos shingles of the type made of asbestos cemented to form a body having a substantially continuous surface can be treated as can glass fiber-resin laminates, and plastic articles of all kinds.

Considering with greater particularity the composition of the treating sol used in a process of this invention it is noted that the sol consists of a liquid continuous phase and a dispersed solid phase. Since the particles in the dispersed phase are within the colloidal range the dispersion will be relatively stable, but permanent stability is unimportant; it is sufficient if a sol is stable for a long enough time to permit uniform application to the surface to be treated.

The nature of the continuous phase is also relatively unimportant, provided it can be removed by ordinary methods after application of the sol to the surface being treated. Removal is usually effected by evaporation and hence relatively non-volatile liquids, such as ethylene glycol or glycerine are not preferred as the continuous phase of the sol. Inclusion of relatively small amounts of such high-boiling liquids, as adjuvants, in the treatment is not, of course, precluded. Organosols, in which the continuous phase is a common solvent such as methanol, ethanol, isopropanol, butanol, acetone, toluene, formic acid, dimethylformamide, methylethylketone, or a liquid hydrocarbon, are quite often well suited to the purpose because of the volatility of the liquid, but care must be exercised that the organic solvent chosen does not have a deleterious effect upon the surface being treated. For instance, acetone could not be used in the sol for the treatment of many kinds of paint surfaces although it would be entirely suitable for sols being used to treat masonry.

Aquasols of particles having the required properties are easy to prepare and are applicable to the treatment of a wide variety of surfaces. The aqueous phase is easily removed by common techniques after treatment of the surface. Aquasols are therefore a highly preferred type for use in processes of this invention.

As already mentioned, the dispersed or discontinuous phase of the sol comprises water-insoluble, inorganic particles having at least two dimensions in the range of 5 to 20 millimicrons which preferably are coalescible with a surface area loss of 1 to 80%. It is even more preferred that the surface area loss upon coalescence be in the range of 2 to 60%. In the most preferred aspect the particles are in the size range of 5 to 9 millimicrons and are substantially spherical and discrete.

The particle size may be determined in a variety of ways well known to the art. The particle size may be directly determined, for example, by electron micrographs, or indirectly measured by methods such as centrifugal sedimentation, light scattering, viscosity measurements, or measurements of the surface area.

The measurement of surface area is also useful in determining the percent coalescence, as previously explained. Surface area measurements can be made by nitrogen adsorption, dye adsorption, or by titration of reactive surface groups with suitable reagents.

Surface area can also be computed from a knowledge of particle size, particle shape, and size distribution obtained by electron micrographs or by sedimentation, and the density and geometry of the particles.

Considering these techniques in somewhat greater detail, units in the size range of 5–150 m$\mu$ can be observed in the electron microscope, and the average unit diameter determined by direct measurement. However, in the electron microscope it is impossible to tell whether the units are linked together through a coalescence of the units to a greater or less degree, or whether the units are separate and discrete particles lying together only in loose contact. If the latter is the case, the units may be readily redispersed in fluid medium to a colloidal state, and the particles do not therefore constist of coherent aggregates. On the other hand, in the case of coherent aggregates, the ultimate units are linked together through primary chemical bonds.

The electron microscope is particularly well adapted to the determination of apparent specific surface area, particle size and shape, particle size distribution and degree of dispersion and flocculation or aggregation in any finely divided material which has ultimate particles in the size range of a few microns to about 5 m$\mu$. The method used in mounting the sample for observation under the electron microscope in a manner which will insure an accurate representation of the material and avoid changes due to the process of examination, a method for measuring particle sizes from projected images from the electron microscope photograph, and statistical methods for determining the mean diameter and mean specific surface areas from the particle count data are described in detail by J. H. L. Watson in Analytical Chemistry, 20, page 576, (June 1948).

Nitrogen adsorption provides an accurate method for determining the specific surface area of the substrate. Since the nitrogen molecule has a diameter of less than 0.5 m$\mu$, it can penetrate essentially all of the pores of the substrate and is readily adsorbed by all the exposed surfaces. A method for measuring specific surface areas by nitrogen adsorption is given in an article "A New Method for Measuring the Surface Areas of Finely Divided Materials and for Determining the Size of Particles," by Emmett, in the publication, Symposium on New Methods for Particle Size Determinations in the Sub Sieve Range, published by the American Society for Testing Materials, March 4, 1941, page 95. The value of 0.162 square millimicron for the area covered by one surface-adsorbed nitrogen molecule is used in calculating the specific surface areas. These are expressed in square meters per gram.

The above-described electron microscope observation and nitrogen adsorption techniques may be used to determine the degree to which the ultimate unit particles or aggregates are linked together. Assuming that each ultimate unit observed in the electron micrograph is a separate and distinct particle, not linked chemically to other particles, the specific surface area of the particle is calculated, using the known density of the ultimate unit. Then the specific surface area is determined by nitrogen adsorption. In the case of units which are united together, or coalesced to form coherent aggregates, the specific surface area calculated from electron micrographs is greater than the specific surface area as determined by nitrogen adsorption, since some of the apparent surface area of the units is taken up by the direct points of contact with the adjacent particles. The degree to which the units are coalesced may be expressed by the percent coalescence as previously mentioned.

With perfectly smooth units the percent coalescence expression would be $$\text{Percent coalescence} = \frac{(S_c - S_n)}{(S_c)} \times 100$$

where $S_c$ denotes the surface area calculated from the measured diameters of the particles as determined by the electron microscope and $S_n$ denotes the surface area obtained by nitrogen adsorption. However, in actual practice with finely divided particles in the size range of 5–100 m$\mu$, the surface area calculated from the electron micrograph is always smaller than the actual surface area as determined by nitrogen adsorption for non-coalesced particles. This is probably because the surface of the particles contains small irregularities and indentations not visible in the electron microscope. The additional surface contributed by these irregularities is approximately 25% of the total surface. Therefore, the percent coalescence expression will be $$\text{Percent coalescence} = \frac{(1.25 S_c - S_n)}{(1.25 S_c)} \times 100$$

rather than the expression previously given. It should be noted that this correction is necessary only when the surface area of the non-coalesced particles is determined by means of the electron microscope.

In many instances, rather than determining the surface area as discussed above, it will be possible to determine the surface area of the non-coalesced particles by the same technique as that used in the determination of the surface area after coalescence. This has the advantage common to most differential analytical procedures that constant sources of error tend to be cancelled or minimized due to the procedural similarity in the pair of determinations.

For example, it is frequently possible to determine the surface area of both the coalesced and the non-coalesced particles by means of nitrogen adsorption. In order to do this, it is necessary to isolate the colloidal particles from the sol phase in a manner which substantially prevents coalescence. This may be done by replacing the more polar solvents in which the sol initially is dispersed with less polar solvents having a lower surface tension, heating under pressure to above the critical point of the less polar solvent, and venting as described in greater detail in Kistler Patents 2,093,454; 2,188,007; and 2,249,767. An alternative procedure which accomplishes much the same result is that of freeze drying. In this technique, the sol is frozen as rapidly as possible at a low temperature, for example, minus 80° C., and the solvent phase of the sol is then removed by sublimation while keeping the frozen mass at a very low temperature by means of the application of a high vacuum to the frozen sol. Using either one of these techniques, it is possible to isolate even highly surface reactive sols with substantially no coalescence. The surface area can be determined by nitrogen adsorption on the isolated product and this can be compared with a similar surface area determination on the coalesced sols which have been obtained by drying under conditions analogous to those which are to be used in the anti-soiling treatment.

Another procedure which is frequently useful in determining the surface area of both coalesced and non-coalesced particles is that of titration of the reactive surface groups. For example, the surfaces will frequently consist of weakly acidic or weakly basic surface groups. This is true, for instance, in the case of the highly preferred hydrous metal oxides and hydroxides of groups III and IV metals previously mentioned. Such surfaces can be titrated with either acids or bases, as appropriate, in much the same fashion that weak, polymeric, organic acids and bases might be titrated.

For example, the weakly acidic silanol groups on the surfaces of amorphous hydrated silica particles may be titrated with strong bases such as sodium hydroxide and the surface area deduced from the milliequivalents of base necessary to increase the pH from an initial value of 4 to a value of 9. Since the concentration of surface silanol groups will be proportional to the exposed surface area, the milliequivalents of base necessary to titrate these surface groups will also be proportional to the surface area. The relationship between surface area and milliequivalents of base may be established empirically by titration of samples of known surface area where the surface area has been determined independently as, for example, by nitrogen adsorption. Alternatively, the amount of base required for a given amount of surface can be calculated from a knowledge of the surface structure and the acidity of the surface groups. Further details on the application of this type of procedure can be found in an article by K. G. Ashley and W. D. Innes—Industrial and Engineering Chemistry, 44, pages 2857–2863 (1952).

Another procedure for determining surface areas which again depends upon the presence of reactive groups on the surface, is that of measuring the adsorption of a dye which is adsorbed by the polar groups on the surface. The previously mentioned adsorption of methyl red on surfaces containing metal-hydroxy groups is such a method. As noted, this method is also useful in distinguishing between the percentage of polar groups such as metal-hydroxy groups on the surface and less polar groups such as metal-alkoxy or metal-alkyl groups, when the surfaces have been modified by procedures such as those previously discussed.

The specific hydroxylated surface areas of metal oxides and hydroxides having surface metal hydroxide groups may be calculated by measuring the amount of methyl red dye which will adsorb on such surfaces. A description of such a method for determining surface areas has been published by I. Shapiro and I. M. Kolthoff in the Journal of the American Chemical Society, 72, page 776 (1950).

It is essential for the correct application of the dye adsorption method that the free alkali metal concentration at the surface of the metal oxide or hydroxide be low. If necessary, this may be accomplished by washing the precipitated particles or by ion exchange techniques so that the pH of the sol or a water slurry of the precipitated particles is less than 10. The particles must, of course, be isolated from solution by one of the procedures discussed above which allows the isolation of the particles with a minimum of coalescence. The test is carried out by agitating a suspension of a few tenths of a gram of the dry particles in an anhydrous benzene solution of methyl red. The acid form of methyl red, p-dimethylaminoacyl benzene-o-carboxylic acid,

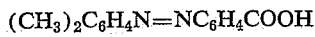

is used. Equilibrium adsorption is reached in about two hours, and an equilibrium concentration of 400 milligrams of dye per liter insures saturation adsorption. The methyl red adsorption capacity is calculated from the observed decrease in dye concentration during the shaking, in relationship to the weight of sample as follows: Methyl red adsorption capacity=(grams dye absorbed)/(grams of sample employed). Adsorption spectrophotometric observations at 475 millimicrons' wavelength are most convenient for the analysis of both the original and the equilibrium benzene solutions of methyl red. The specific hydroxylated surface area in square meters per gram is calculated according to the following equations utilizing the covering power of each adsorbed methyl red molecule which is approximately 1.16 m$\mu^2$ as determined by correlation with nitrogen adsorption measurements; specific hydroxylated surface area in meters square per gram=(methyl red adsorption capacity)/(molecular weight of methyl red)×116×10$^{-20}$×Avogadro's number. When the particles have been esterified or otherwise surface modified in a fashion to decrease the polarity of the surface group, the methyl red dye will not adsorb on the less polar portions of the surface. Consequently, measurement of the adsorption of the methyl red dye before and after esterification or other surface modifications leading to less polar surface groups shows a decrease which is proportional to the decrease in exposed specific hydroxylated surface area. This may be used, as previously discussed, to determine the fraction of the surface which has been deactivated toward coalescence by the surface modification.

For samples which have not been surface-modified, a contrast of the dye surface area before and after coalescence will indicate the number of polar surface groups which have been used in coalescence and it thus can be used as a measure of percent coalescence in common with similar procedures already outlined.

The particles in the treating sol can be insoluble compounds such as hydrous metal oxides, metal hydroxides, silicates, phosphates, zirconates, titanates, aluminates, sulfates, and carbonates, and basic salts of the foregoing. Included among the metal oxides are alumina, titania, zirconia, magnesia, zinc oxide, and tin oxide. Sols of colored particles can be used where the color is not objectionable and will prevent acquisition of soils of other color. Thus there may be used chromic oxide and ferric oxide.

Typical compounds among the other groups of suitable particles are silicates, zirconates, and titanates of magnesium, calcium, barium and aluminum; lithium, sodium and potassium alumino-silicates; and more complex compounds such as sodium magnesium alumino- or ferro-silicates. Such compounds as barium sulfate and calcium carbonate can also be used.

As long as the compounds used can be prepared as stable colloids with reactive groups on their surfaces capable of causing coalescence, the crystal structure is relatively immaterial. Thus amorphous materials like amorphous hydrated silica, amorphous hydrated titania, and amorphous aluminum hydroxide can be employed. Similarly, crystalline materials such as the rutile and anatase modifications of titanium dioxide can be used when they are prepared under conditions such that reactive metal hydroxide bonds are present at the surface. On the other hand, crystalline materials which have been calcined or otherwise formed under conditions such that essentially non-reactive surface groups result are not preferred since such materials will not generally coalesce except under conditions of application which would destroy many of the substrates to which they might be applied. Such materials as quartz, crystabolite, trydymite, calcined anatase or rutile, corundum, etc., are therefore not suitable anti-soiling particles for use in a sol. Many of the naturally occurring oxides and silicate minerals are unsuitable for similar reasons. While the particles in the sol are primarily inorganic in character, this does not mean that they can not have surface treatments which contain organic groups.

After deposition of the sol particles on the substrate and elimination of the continuous phase there will still be chemically reactive groups on the surface of the coalesced aggregates since only a partial coalescence has occurred. These groups can interact with chemical reagents used in cleaning solutions to develop an electric charge on the surface and lead to a partial peptization or suspension of the aggregates not strongly retained in surface irregularities. Such peptization is not objectionable in some instances and is frequently preferred since it enhances the ease of cleaning of a treated surface after soiling. This repeptization should not be confused with a dissolution of the bonds between the aggregates which would completely remove the anti-soiling treatment. On the other hand the extent of coalescence obtainable with particles of a particular material can be varied by chemically modifying the surface groups. For example, the silica particles in silica sols can be partially surface-reacted with organic alcohols to form surfaces having both organic ester groups and unreacted hydroxy groups. In a similar manner, sols of metal oxides or hydroxides can be reacted with organic acids, organic chelating groups, or mixed organo-inorganic reagents such as alkyl chlorosilanes, in such a manner as to substitute chemically less reactive or non-reactive groups for surface-metal hydroxide groups. Such replacement may be frequently desired in order to prevent excessive coalescence, but it is not preferred to so completely replace the reactive groups that coalescence upon drying is prevented.

The hydrous oxides and hydroxides of metals of groups III and IV of the periodic table and mixed compounds comprising them are the most highly preferred anti-soiling agents. It is relatively easy to prepare such materials in the form of colorless, stable, water-insoluble, small particle size, coalescible colloidal sols.

By far the most preferred sols are those of silica, especially of amorphous silica.

The particles in silica sols of the type just mentioned have surfaces comprising highly reactive silanol (that is, Si—O—H) groups which interact between particles upon drying at temperatures up to say 110° C. to form water-insoluble bonds of the siloxane (Si—O—Si) type.

Suitable silica sols can be prepared by a variety of methods with which the art is already familiar. For instance, there may be used sols as prepared in the White Patent 2,375,738. These are not preferred because the particle size is in the range of about 30 millimicrons and the particles are not discrete but are aggregated into clusters. They nevertheless will give some benefit in unusual circumstances and where whitening is not objectionable. The sols of the Bird Patent 2,244,325 and Voorhees Patent 2,457,971 can also be used. Generally these sols as prepared by ion-exchange have a particle size below 5 millimicrons and hence are below the lower limit of desired size range but the particles may be grown by heating them. Also, the sols have a tendency to coalesce more than the desired 80% maximum.

Silica sols more effective than those just mentioned can be prepared according to processes shown in Bechtold and Snyder Patent 2,574,902. The sols of this patent have uniform, discrete, spherical particles of about 15 to 150 millimicrons in diameter. Sols produced as shown which have particles up to about 20 millimicrons are suitable for use according to processes of the present invention. Similarly suitable are the sols of the Rule Patents 2,577,484 and 2,577,485. These sols are composed of discrete silica particles in the diameter range of about 10 to 150 millimicrons; of these, one may use sols in which the particle size ranges from about 10 to 20 millimicrons.

The most preferred sols for use according to the present invention are silica sols in which the particle size range is from 5 to 9 millimicrons but which are otherwise like the sols of the Bechtold and Snyder and Rule patents. Such sols can be prepared by processes described in United States application Serial No. 412,627, filed February 25, 1954, by Guy B. Alexander, and now Patent No. 2,750,345.

The silica sols just mentioned are alkali-stabilized, but the amount of alkali used is so small that the sols are not in any sense solutions of an alkali silicate. The silica sols can be surface-modified with organic substances as already mentioned. For example, amorphous silica sols like those mentioned can be transferred into organic solvents as described in Moulton U. S. Patent 2,536,764. The sols can be reacted with primary or secondary alcohols after the water content has been reduced to a very low value to achieve a partial surface esterification. Alternatively, after transfer to a suitable inert organic solvent, such sols can be reacted with groups such as chlorotrimethylsilane in order to form surface (Si—C—R) bonds which will not coalesce upon drying. The fraction of the reacted silanol surface which is blocked by reactions with organic materials as described can be measured experimentally by the decrease in methyl red dye adsorption, can be computed from an analysis of the carbon content of the surface-modified particles, or can be determined directly as by hydrolyzing or otherwise removing the surface-bonded organic groups and determining their concentration in appropriate manner.

Sols of colloidal particles as above-described are operable for improving the soil resistance of surfaces according to processes of this invention without the use of any adjuvant. However, in some situations operability can be improved or rendered optimum by inclusion of adjuvants as hereinafter described.

By including a surface-active agent, hereinafter referred to as a "surfactant," in certain aquasols, a remarkable improvement in the ability of the aquasols to form anti-soiling coatings on surfaces of the class described can be effected. This improvement is observed in sols, the discontinuous phase of which consists essentially of water-insoluble, substantially inorganic particles which are coalescible with a specific surface area loss of 1 to 80 percent and which have at least two dimensions in the range of 5 to 20 millimicrons, and especially in amorphous silica aquasols in which the particles are substantially discrete and spherical and are from 5 to 9 millimicrons in diameter. The action of the surfactant is not merely to lower the surface tension of the liquid, but is in some unexplained manner associated with the nature of the particles in the treating sol.

The proportion of surfactant in a preferred treating composition can be considerably varied depending on the nature of the surfactant, but in general will lie within the range of from .01 to 8.0% based upon the weight of the aquasol.

Any anionic, cationic, or non-ionic surfactant can be used. Some of the more common, suitable anionic surfactants are: sodium oleate, sodium resinate, sodium isopropylnaphthalenesulfonate, sodium dodecylbenzenesulfonate, sodium monobutylphenylphenolmonosulfonate, sodium dibutylphenylphenoldisulfonate, sodium dioctylsulfosuccinate, sodium lauryl sulfate, sodium salt of sulfated fatty acid monoglyceride, the potassium and ammonium salts of each of the foregoing, and alkali metal and ammonium sulfonates of petroleum hydrocarbons. Suitable cationic surfactants include: cetyltrimethylammonium bromide, dodecylammonium chloride, coconut fatty alkyl dimethylbenzylammonium chloride, and long-chain alkyl quaternary ammonium salts generally. Suitable non-ionic surfactants include: reaction products of hydrophobic alcohols or phenols with ethylene oxide or propylene oxide, fatty acid esters of polyethylene glycol, and thermal reaction products of coconut oil fatty acids with diethanolamine.

Although they can in some circumstances be used, it is usually not preferred to employ wetting agents having a sign opposite in charge from that of the colloidal particle. By this it is meant that wetting agents wherein the hydrophobic portion of the molecule after ionization bears a sign opposite to that of the colloidal particle frequently have a tendency to cause flocculation and precipitation of the colloidal particles and are thus not preferred.

The art is familiar with surfactants, these agents being described in "Surface Active Agents," by Schwartz and Perry, published by Interscience Publishers, Inc., New York, 1949, and in "Synthetic Detergents," by J. W. McCutcheon, published by MacNair-Dorland Co., New York, 1950, and any of the surfactants therein referred to can be used.

The compositions of this invention can be used in conjunction with agents applied for other objectives than to effect anti-soiling. They can be used with such materials as anti-static agents, water repellents, and flame retardants, for instance.

The processes of the present invention comprise at least partially filling the surface irregularities, in a surface of the nature described, with inorganic particles having an ultimate size in the range of 5 to 20 millimicrons by applying a sol of the particles to the surface and removing the continuous liquid phase of the sol. The sol can be applied by such methods as brushing, spraying, immersion, or any other method adapted to give a continuous coating of the sol on the surface. The amount of sol to use will be enough to cover the surface being treated; this will vary widely, depending upon the specific character of the surface and to what extent the sol penetrates the surface. There is no advantage to be gained from using a large excess over that required for coverage, and in some instances a large excess will be found detrimental. One skilled in the art can readily ascertain, by visual inspection, when enough sol has been applied to give a continuous coating.

The continuous liquid phase of the sol is removed after such application by causing the treated surface to dry in air under ordinary atmospheric conditions or by mild heating of the system to a temperature not above the decomposition temperature of the surface treated, if desired at reduced pressure. Other methods, such as replacement of a less volatile liquid with a more volatile one, or permitting the liquid to diffuse into or through the substrate surface, may also be employed.

The treated articles of the present invention have an increased resistance to soiling and when soiled the articles are easier to clean. The articles have a surface which is unitary and substantially continuous and which contains surface irregularities before the treatment giving it a 60° Gardner gloss rating of 5 to 85. After the treatment the article contains a coating of water-insoluble, inorganic particles having at least two dimensions in the range of 5 to 20 millimicrons. The particles are coalesced to the extent that the surface area is 1 to 80 percent or, preferably 2 to 60 percent, less than that of the particles dispersed as a colloidal sol.

It will be understood that the selection of the particular sol for use in a process of this invention will depend to some extent upon the soil conditions to which the treated article will be subjected. Thus, the larger the particles of soil, the larger will be the particles which can be used in the treating sol. For instance, the soil can be collected, as by means of a vacuum cleaner, and actually examined under an electron microscope to determine its particle size. If the size is relatively large—that is, larger than say 100 millimicrons—then the treating sol can contain particles as large as 20 millimicrons. Generally speaking, sols containing particles of 5 to 20 millimicrons are effective against any of the common soiling materials and for the same reason it is very much preferred to use sols which have a particle size below 9 millimicrons and preferably from 5 to 9 millimicrons. The latter have the property of being smaller than any of the dirt normally encountered and yet by coalescence the particles can occupy pores of larger size and thus effectively protect against soiling on surfaces with a variety of pore sizes against a variety of sizes of dirt.

The invention will be better understood by reference to the following illustrative examples:

Example 1

Heavy cardboard panels (Bristol board) were spray-painted with two coats of a commercial alkyd resin white paint, allowing a 48-hour drying period between coats and a 30-day drying period after the second coat and prior to use. The paint film was visually smooth and continuous, and had a gloss of 16 as measured with a Gardner portable 60° glossmeter.

The anti-soil treating agents used were two colloidal silica sols containing, respectively, 7 and 20 millimicron particles as determined by means of electron micrographs.

The 20 millimicron particle sol was prepared by the constant-volume evaporation of an ion-exchange effluent obtained by passing a sodium silicate solution containing 2.4% $SiO_2$ through a bed of cation exchange resin in the hydrogen form according to the teachings of the above-mentioned Bechtold and Snyder Patent 2,574,902. The constant volume evaporation effected a build-up of the size of the particles in the sol. This sol was practically clear, having only a slight opalescence. It was stable indefinitely under ordinary conditions of storage or even when kept at 95% C. The sol had an $SiO_2:Na_2O$ mole ratio of 92:1 and a pH of 9.6 to 9.8. The sol contained substantially spherical, non-agglomerated, dense ultimate particles of silica, substantially all of which had an average diameter of about 15 to 20 millimicrons and at least 80% of which had an average diameter of form 0.5 to 1.7 times the arithmetic mean particle diameter, as measured by means of the electron microscope. The spherical, non-agglomerated nature of the particles was also indicated by the low relative viscosity of the sol, which was from 1.2 to 1.4 as measured at 10% $SiO_2$ concentration and a pH of 10 at 25° C. When the sol was adjusted to a pH of 3.5 with dilute HCl and evaporated to dryness, the resulting powder had a specific surface area, as measured by nitrogen adsorption, of about 200 m.$^2$/g. The silica particles had a molecular weight, as determined by light scattering of the sol, of about 3 to 8 million. The density of the sol at 60° F. was 1.2 g./cc. The freezing point of the sol was 32° F. The sol had an extinction coefficient of less than 0.24 for light of a wavelength of 400 millimicrons.

The sol had the following average analysis:

| | Percent |
| --- | --- |
| $SiO_2$ | 30.06 |
| $Na_2O$ | 0.326 |
| $SO_4$ as $Na_2SO_4$ | 0.10 |
| Cl as NaCl | 0.05 |
| Sulfated non-siliceous ash: | |
|   Before leaching | 1.20 |
|   After leaching | 0.05 |

The 7 millimicron sol was prepared according to a process of the above-mentioned Alexander application Serial No. 412,627, by forming a dilute silica aquasol of particles smaller than 4 millimicrons by ion-exchange from a sodium silicate solution, alkalizing the sol to an $SiO_2:Na_2O$ ratio of 80, and heating the alkalized sol to the boiling temperature until the surface area had dropped to about 400 square meters per gram.

The sols were diluted to 3% $SiO_2$ with distilled water and 0.25% of an anionic surface active agent, dioctyl ester of sodium sulfosuccinic acid (Aerosol OT, American Cyanamid Co.), was added. The treating agents were supplied to the painted panel by brushing, employing only sufficient liquid to insure complete coverage of the surface being treated. The coated surfaces were air dried for from 4 to 16 hours.

Carbon blacks of four different particle sizes were used to soil the above-described treated and untreated painted panels. These carbon blacks were obtained from Godfrey L. Cabot, Inc. and are described in detail in a publication of that company entitled "Cabot Carbon Blacks Under the Electron Microscope," vol. 2, No. 10, October 1949, as follows:

| Synthetic Soil | Manufacturer's Designation | Particle Diameter, Arithmetic Mean,[1] m$\mu$ | Nitrogen Surface Area,[2] m.$^2$/g. |
| --- | --- | --- | --- |
| 1 | Carbolac 1 | 10 | 1,000 |
| 2 | Kalista | 30 | 315 |
| 3 | Sterling R | 40 | 75 |
| 4 | do | 80 | 22 |

[1] Particle size measurements made by means of the electron microscope.
[2] Brumauer, Emmett and Teller's nitrogen adsorption method (J. Am. Chem. Soc., 60, 309 (1938)).

Particle size distribution curves and electron micrographs of these carbon blacks are presented in the above Cabot publication. The particle size distribution curve is narrow for soils 1 and 2, moderately narrow for soil 3, and fairly broad for soil 4. The electron micrographs show the particles to be moderately aggregated.

Soiling was accomplished by brushing the synthetic soils onto the treated and control test panels with a soft camel hair brush until the surface was soiled to saturation; i. e., continued soiling caused no further darkening of the panel. The excess soil was removed by vacuuming without touching the surface of the panel; the reflectance of the soiled area was measured; the panel was wiped free of all removable soil with a soft paper tissue; reflectance was again measured; the panel was washed thoroughly with a sponge saturated with a 2% solution of potassium oleate soap, rinsed, dried, and a final reflectance measurement made.

Reflectance was used as a measure of the degree of soiling. Reflectance, the percentage of the total incident light reflected from a surface, was measured with a Model 610 reflectometer made by the Photovolt Corp., New York, N. Y., fitted with a Model 610Y search unit, tristimulus green filter and standardized at a reflectance of 19.5 in all cases.

The reflectance of the painted test panel prior to treatment or soiling was approximately 90. After soiling and vacuuming the treated and control areas of this paint film the degree of soiling was rated, by means of the reflectometer.

| Silica Sol Particle Size | Reflectance After Soiling | | |
|---|---|---|---|
| | Soil 2 (30 mµ) | Soil 3 (40 mµ) | Soil 4 (80 mµ) |
| 7 mµ | 75.2 | 79.7 | 83.8 |
| 20 mµ | 69.4 | 78.8 | 84.5 |
| Control (No sol) | 7.5 | 4.0 | 5.4 |

The untreated control areas of the paint film were extremely receptive to all three synthetic soils and after vacuuming appeared essentially black, as denoted by the very low reflectance values. The areas treated with the 7 and 20 millimicron particle silica sols appeared, in contrast, to be virtually "soil-proof." These anti-soil treating agents were approximately equal and far superior to all other treating agents as concerns anti-soil effectiveness.

| Silica Sol Particle Size | Reflectance After Soiling | | |
|---|---|---|---|
| | Soil 2 (30 mµ) | Soil 3 (40 mµ) | Soil 4 (80 mµ) |
| 7 mµ | 83.0 | 83.9 | 84.6 |
| 20 mµ | 75.9 | 82.5 | 84.4 |
| Control (No sol) | 11.0 | 91.4 | 16.8 |

Dry wiping did not change the reflectance of the treated and untreated soiled areas greatly, which indicates that most of this soil is permanently entrapped in surface cracks and holes. The control areas appeared almost black in relation to the areas which had been treated with 7 and 20 mµ silica sols and which appeared virtually "soilproof."

These data show a correlation between silica size and soil size. As the particle size of the colloidal silica treating dispersion decreases, its general effectiveness as an anti-soil agent increases. The 7 millimicron sol is significantly better than the 20 millimicron sol, particularly against the smaller-sized soils. Maximum anti-soil effectiveness is obtained when the size of the treating agent is less than that of the soil against which protection is desired.

*Example 2*

This example is an extension of the test conditions described in Example 1 in that after soiling, vacuuming, wiping and measuring the reflectance, the panels were washed and dried, re-soiled, vacuumed and wiped, and washed and dried again. Under these conditions the permanence of the anti-soil treatment to washing was demonstrated. Reflectance was measured in the manner described in Example 1, after each of the above soil and wash steps. The panels were washed by scrubbing thoroughly with a cellulose sponge soaked with 2% neutral potassium oleate soap, rinsed, and oven dried for 15 minutes at 110° C. The results are as follows:

| Silica Sol Particle Size | Reflectance, Using Synthetic Soil No. 1 (10 mµ dia.) | | | |
|---|---|---|---|---|
| | Soiled, Vac'd and Wiped | Washed | Re-soiled, Vac'd and Wiped | Rewashed |
| 7 mµ | 68.5 | 90.0 | 65.2 | 83.0 |
| 20 mµ | 65.0 | 90.0 | 54.0 | 65.5 |
| (Control-No sol) | 29.5 | 36.0 | 20.5 | 27.0 |

| | Reflectance, Using Synthetic Soil No. 4 (80 mµ dia.) | | | |
|---|---|---|---|---|
| 7 mµ | 76.7 | 81.0 | 67.0 | 76.5 |
| 20 mµ | 83.0 | 89.5 | 21.0 | 59.5 |
| (Control-No sol) | 17.0 | 11.2 | 6.0 | 9.0 |

Examination of this data particularly in the column headed "Soiled, vac'd and wiped," again demonstrates the importance of the particle size of the treating agent as related to anti-soil effectiveness. The 7 and 20 mµ particle size sols showed approximately equally effective anti-soiling action against synthetic soil No. 4 (80 mµ), but against synthetic soil No. 1 (10 mµ) the smaller, 7 mµ, treating agent is by far the most effective. As in Example 1, as the particle size of the treating agent increases, its effectiveness as an anti-soil agent decreases.

Inspection of the reflectance data shows that all of the anti-soil treating agents caused the release of soil on washing the first time. Only the panels treated with 7 mµ particle-sized sol retained a high degree of their anti-soil properties upon resoiling and after the second washing. The larger particle-sized silica treating agents cleaned well upon initial washing because of their "chalking or peptizing action" (chalking increases with increase in silica particle size), but failed to protect efficiently against resoiling because most of the surface treatment and some of the "hole-filling" treatment had been removed by washing. The 7 mµ particle-sized sol was the most effective treating agent because it could fill smaller soil receptor sites and had greater coalescence power and, therefore, greater permanence.

*Example 3*

A No. 1 white pine board was sanded smooth and finished by brushing on two coats of a high grade alkyd spar varnish. After drying for several months, one-half of the varnished area was rubbed down with No. 00 steel wool until the surface was smooth and lustrous. Separate areas of the steel-wooled surface and of the original varnished surface were brush-coated with an aqueous colloidal silica sol of 20 mµ particles as described in Example 1 and with a silica organo-sol comprising 3% $SiO_2$ in normal propyl alcohol. This organo-sol was prepared from an aqueous colloidal silica sol similar to the 20 mµ aquasol of Example 1, by first reducing the electrolyte content of the sol to a low level by deionization as described in Rule Patent 2,577,485, column 7, line 39 through column 9, line 23, and then transferring the silica to normal propyl alcohol by adding propyl alcohol and removing water by azeotropic distillation.

The soil employed was prepared according to the procedure described by Sanders and Lambert, "An Approach to a More Realistic Cotton Detergency Test," J. Am. Oil Chem. Soc., May 1950. The composition of this soil is based on the analysis of natural soils collected from the streets of six large cities in the United States. The composition and particle size range of the synthetic soil closely approximates the average of the natural soils upon which it is based, being as follows:

| No. | Sanders-Lambert Soil | | |
|---|---|---|---|
| | Component | Source | Percentage |
| 1 | Humus | Hyper Humus Co., Newton, N. J. | 35 |
| 2 | Cement | Alpha Portland Cement Co. (Type 1). | 15 |
| 3 | Silica | Davison Chemical Co., silica gel, 200 mesh. | 15 |
| 4 | Clay | Harris Clay Co., Kamec clay | 15 |
| 5 | Sodium chloride | Mallinckrodt, CP | 5 |
| 6 | Gelatin | American Agricultural Chemicals Co. | 3.5 |
| 7 | Carbon black | Binney and Smith, Molacco furnace black. | 1.5 |
| 8 | Iron oxide | C. K. Williams, red, N1860 | 0.25 |
| 9 | Stearic acid | Allied Chemical & Dye Co., N. S. | 1.6 |
| 10 | Oleic acid | Allied Chemical & Dye Co., U.S.P. | 1.6 |
| 11 | Palm oil fatty acid | Wecoline (PD) | 3 |
| 12 | Lanolin | Merck and Co., anhydrous | 1 |
| 13 | n-Octadecane | Humphrey Wilkinson | 1 |
| 14 | n-Octadecene | do | 1 |
| 15 | Lauryl alcohol | Eastman Kodak, CP | 0.5 |

This soil was prepared by milling the above listed components in a pebble mill together with 1½ times their weight of water for 18 hrs., after which time the slurry was evaporated to dryness, pulverized by remilling dry for 4 hours, and passed through a 200 mesh screen.

A modified Canders-Lambert soil was prepared as above except that the organic constituents, Nos. 9 to 15 inclusive, were omitted. This omission resulted in the modified soil having a larger number of smaller sized particles. The result of this difference in particle size, as will be seen in this and the following examples, is that the modified material soils more severely than does the unmodified.

After the treated, varnished pine panels had been dried as in Example 1, the modified Sanders-Lambert soil was brushed onto the treated and control areas, vacuumed, and wiped with a paper tissue as in Example 1, and the soiled areas were rated for soil retention by measurement of reflectance, with the following results:

|  | Varnished Pine | | | Varnished and Steel-Wooled Pine | | |
| --- | --- | --- | --- | --- | --- | --- |
|  | 20 mµ Silica Aquasol | Control | 20 mµ Silica Aquasol | 20 mµ Silica Aquasol | Control | 20 mµ Silica Aquasol |
| Initial, 60° gloss | 39 | 45 | 59 | 18 | 23 | 57 |
| Reflectance | 52.2 | 52.0 | 49.8 | 52.4 | 55.8 | 48.8 |
| Reflectance, after soiling and wiping | 50.0 | 42.2 | 49.6 | 48.0 | 32.2 | 47.4 |

The gloss was found to be greatly increased by treatment with the organosol. Visually, the gloss of the areas treated with the aquasol was moderately greater than the untreated control areas, while the improvement due to the silica organosol was similar to that which would be expected of a thin coat of varnish.

From the reflectance data it can be seen that the treatment with organosol rendered this surface essentially soilproof to this type of soil, and that treatment with the aquasol permitted only a slight degree of soiling.

Example 4

A section of fir plywood was sanded smooth and sprayed with two coats of a white-pigmented, nitrocellulose lacquer, allowing 24 hours' drying time between coats and 3 weeks' drying time after the second coat. The panel was divided into three sections; two of the sections were treated with the 20 mµ silica aquasol and with the 20 mµ silica organosol as described in Example 3, while the third section was left untreated. The 60° gloss of the treated and control areas was measured. The panel was then soiled with the modified and unmodified Sanders-Lambert soils as described in Example 3.

|  | 20 mµ Silica Aquasol | Control | 20 mµ Silica Organosol |
| --- | --- | --- | --- |
| Initial, 60° Gloss | 10 | 4 | 5 |
| Reflectance | 79.0 | 79.0 | 79.0 |
| Reflectance after soiling and wiping, using Sanders-Lambert soil: | | | |
| Unmodified | 76.8 | 59.8 | 71.5 |
| Modified | 71.5 | 54.5 | 73.5 |

On this low-gloss lacquer surface, the 20 mµ silica aquasol caused a two-fold increase in gloss while the 20 mµ silica organosol had little effect on gloss. The reflectance values show that both treated areas retained much less soil than the untreated control area; the treatments caused the surface to be virtually soilproof. The modified Sanders-Lambert soil soiled more severely than its larger particle-sized, unmodified counterpart which contained organic components.

Example 5

A No. 1 white pine panel was brush-painted with two coats of an alkyd resin, titanium oxide-pigmented, white, outside house paint. After drying for 2 weeks, separate areas of the painted panel were coated with 20 mµ silica aquasol and with 20 mµ silica organosol as described in Example 3. The panel was then soiled with Sanders-Lambert synthetic soils, modified and unmodified, as in Example 3. Gloss and reflectance were measured, with the following results:

|  | 20 mµ Silica Aquasol | Control | 20 mµ Silica Organosol |
| --- | --- | --- | --- |
| Initial: | | | |
| Gloss | 18 | 18 | 29 |
| Reflectance | 89 | 87 | 87 |
| Reflectance after Soiling and wiping, using Sanders-Lambert Soil: | | | |
| Unmodified | 84 | 71 | 76 |
| Modified | 87 | 68 | 71 |

It can be seen that the 20 mµ silica organosol increased the gloss of the surface greatly, while the 20 mµ silica aquasol had no effect on gloss. The data also shows that both treated areas were more resistant to soiling than the untreated control area. On this particular surface, however, the treatment with 20 mµ aquasol was more effective against both soil types than was the 20 mµ organosol. Also, the modified Sanders-Lambert synthetic soil soiled more severely than did its larger particle-sized, unmodified counterpart.

Example 6

A section of polyethylene film was brush-coated over part of its area with 20 mµ silica aquasol as described in Example 1. The air-dried treated film was then soiled with the modified Sanders-Lambert soil of Example 3, by sprinkling the soil liberally as a dust over the untreated and treated areas. The soil was then blown from the polyethylene film with a gentle air stream. All of the soil was readily blown free from the treated area, but only the excess was removable from the untreated area; i. e., the untreated area retained an evenly distributed dust film, whereas, the treated area was dust free. The test was then repeated except that the soil was brushed onto both areas and then wiped with a tissue. The treated area wiped perfectly free of soil, but the untreated area remained extremely soiled.

Example 7

This example demonstrates the effectiveness of an aqueous dispersion of colloidal alumina as an anti-soil agent for painted surfaces. The alumina hydrate sol used was prepared according to Bechtold and Stark U. S. Patent 2,590,833, and was composed of a 3% dispersion of positively charged particles of $Al_2O_3$ in an aqueous media of pH 4.6%, two dimensions of the particles being approximately 5 millimicrons.

The alumina hydrate sol was brush-coated onto half of each of two heavy cardboard panels which had been previously spray-painted with two coats of the following paints:

Panel "A": Polymer-latex-based white paint.
Panel "B": Alkyd-resin-based white paint.

The panels were paint-coated, treated with the alumina hydrate sol, and soiled with the carbon blacks listed as synthetic soils Nos. 1 and 4 in Example 1. Gloss and reflectance measurements were made, after vacuuming and dry wiping the soiled areas with results as follows:

|  | Panel "A" | | Panel "B" | |
|---|---|---|---|---|
|  | Alumina hydrate aquasol | Control | Alumina hydrate aquasol | Control |
| Gloss after treatment | 33 | 32 | 16 | 18 |
| Reflectance after soiling and wiping using Synthetic Soil: | | | | |
| No. 1 | 75 | 34 | 74 | 34 |
| No. 4 | 90 | 8 | 86 | 22 |

We claim:

1. In a process for increasing the soil-resistance of a unitary and substantially continuous solid surface having a 60° Gardner gloss rating of 5 to 85, the steps comprising coating the surface with a sol, the discontinuous phase of which consists essentially of water-insoluble, substantially discrete, inorganic particles having at least two dimensions in the range of 5 to 20 millimicrons, at the time of said coating operation and coalescing the particles upon said surface by removing the continuous phase of the sol from the coating.

2. In a process for increasing the soil-resistance of a unitary and substantially continuous solid surface having a 60° Gardner gloss rating of 5 to 85, the steps comprising coating the surface with a sol, the discontinuous phase of which consists essentially of water-insoluble, substantially discrete, inorganic particle which are coalecible with a specific surface area loss of 1 to 80 percent and have at least two dimensions in the range of 5 to 20 millimicrons at the time of said coating operation, and coalescing the particles upon said surface by removing the continuous phase of the sol from the coating.

3. In a process for increasing the soil-resistance of a unitary and substantially continuous solid surface having a 60° Gardner gloss rating of 5 to 85, the steps comprising coating the surface with a sol, the discontinuous phase of which consists essentially of substantially discrete particles of a water-insoluble solid of the group consisting of oxides and hydroxides of metals of groups III and IV of the periodic table, the particles being coalescible with a specific surface area loss of 1 to 80 percent and having at least two dimensions in the range of 5 to 20 millimicrons at the time of said coating operation and coalescing the particles upon said surface by removing the continuous phase of the sol from the coating.

4. In a process for increasing the soil-resistance of a unitary and substantially continuous solid surface having a 60° Gardner gloss rating of 5 to 85, the steps comprising coating the surface with a sol, the discontinuous phase of which consists essentially of substantially discrete alumina hydrate particles coalescible with a specific surface area loss of 1 to 80 percent and having at least two dimensions in the range of 5 to 20 millimicrons at the time of said coating operation, and coalescing the particles upon said surface by removing the continuous phase of the sol from the coating.

5. In a process for increasing the soil-resistance of a unitary and substantially continuous solid surface having a 60° Gardner gloss rating of 5 to 85, the steps comprising coating the surface with a sol, the discontinuous phase of which consists essentially of substantially discrete amorphous silica particles coalescible with a specific surface area loss of 1 to 80 percent and having at least two dimensions in the range of 5 to 20 millimicrons at the time of said coating operation, and coalescing the particles upon said surface by removing the continuous phase of the sol from the coating.

6. In a process for increasing the soil-resistance of a unitary and substantially continuous solid surface having a 60° Gardner gloss rating of 5 to 85, the steps comprising coating the surface with an aquasol, the discontinuous phase of said sol consisting essentially of substantially discrete, spherical, amorphous silica particles 5 to 20 millimicrons in diameter at the time of said coating operation and the particles being coalescible with a specific surface area loss of 1 to 80 percent, and coalescing the particles upon said surface by drying the coating.

7. In a process for increasing the soil-resistance of a unitary and substantially continuous solid surface having a 60° Gardner gloss rating of 5 to 85, the steps comprising coating the surface with an aquasol, having dissolved therein a surfactant, the discontinuous phase of said sol consisting essentially of substantially discrete, spherical, amorphous silica particles 5 to 20 millimicrons in diameter at the time of said coating operation and the particles being coalescible with a specific surface area loss of 1 to 80 percent, coalescing the particles upon said surface by drying the coating.

References Cited in the file of this patent

UNITED STATES PATENTS

| 2,085,129 | Stoewener | June 29, 1937 |
| 2,266,636 | Hauser | Dec. 16, 1941 |
| 2,570,750 | Bauer | Oct. 9, 1951 |
| 2,622,307 | Cogovan et al. | Dec. 23, 1952 |
| 2,734,834 | Rainard et al. | Feb. 14, 1956 |
| 2,734,835 | Florio et al. | Feb. 14, 1956 |

UNITED STATES PATENT OFFICE

CERTIFICATE OF CORRECTION

Patent No. 2,877,142 March 10, 1959

Robert L. Rusher et al.

It is hereby certified that error appears in the printed specification of the above numbered patent requiring correction and that the said Letters Patent should read as corrected below.

Column 3, line 59, for "soil" read -- sol --; column 4, line 72, for "irreguilarties" read -- irregularities --; column 5, line 25, for "contining" read -- containing --; column 6, line 66, for "constist" read -- consist --; column 9, line 7, for "as" read -- a --; column 13, line 60, for "form" read -- from --; line 70, for "200 m.2/g." read -- 200 m.$^2$/g. --; column 15, line 28, for "91.4" read -- 11.4 --; column 19, line 31, for "particle" read -- particles --.

Signed and sealed this 4th day of August 1959.

(SEAL)

Attest:

KARL H. AXLINE
Attesting Officer

ROBERT C. WATSON
Commissioner of Patents